(12) United States Patent
Schiffmann

(10) Patent No.: US 10,565,468 B2
(45) Date of Patent: Feb. 18, 2020

(54) OBJECT TRACKING SYSTEM WITH RADAR/VISION FUSION FOR AUTOMATED VEHICLES

(71) Applicant: APTIV TECHNOLOGIES LIMITED, St. Michael (BB)

(72) Inventor: Jan K. Schiffmann, Newbury Park, CA (US)

(73) Assignee: Aptiv Technologies Limited (BB)

( * ) Notice: Subject to any disclaimer, the term of this patent is extended or adjusted under 35 U.S.C. 154(b) by 789 days.

(21) Appl. No.: 15/000,730

(22) Filed: Jan. 19, 2016

(65) Prior Publication Data
US 2017/0206436 A1    Jul. 20, 2017

(51) Int. Cl.
| | | |
|---|---|---|
| G06K 9/62 | (2006.01) | |
| B60R 1/00 | (2006.01) | |
| G01S 13/66 | (2006.01) | |
| G01S 13/86 | (2006.01) | |
| G01S 13/93 | (2006.01) | |
| G06K 9/00 | (2006.01) | |
| G01S 13/931 | (2020.01) | |

(52) U.S. Cl.
CPC .............. *G06K 9/6215* (2013.01); *B60R 1/00* (2013.01); *G01S 13/66* (2013.01); *G01S 13/867* (2013.01); *G01S 13/931* (2013.01); *G06K 9/00791* (2013.01); *B60R 2300/301* (2013.01)

(58) Field of Classification Search
CPC .... G06K 9/6215; G06K 9/00791; B60R 1/00; B60R 2300/301; G01S 13/42; G01S 13/66; G01S 13/726; G01S 13/867; G01S 13/931; G01S 13/582; G01S 13/584
See application file for complete search history.

(56) References Cited

U.S. PATENT DOCUMENTS

| | | | |
|---|---|---|---|
| 7,460,951 B2 * | 12/2008 | Altan ................... | G01S 13/726 340/903 |
| 2003/0011509 A1 | 1/2003 | Honda | |
| 2006/0139204 A1 | 6/2006 | Abe et al. | |
| 2007/0073473 A1 * | 3/2007 | Altan ................... | G01S 13/726 701/518 |
| 2010/0191391 A1 * | 7/2010 | Zeng ................... | G01S 13/723 701/1 |
| 2011/0190972 A1 * | 8/2011 | Timmons ............... | G01C 21/34 701/31.4 |
| 2013/0236047 A1 | 9/2013 | Zeng et al. | |

(Continued)

*Primary Examiner* — Bernarr E Gregory
*Assistant Examiner* — Daniel P Malley, Sr.
(74) *Attorney, Agent, or Firm* — Joseph V. Bonadies

(57) ABSTRACT

An object tracking system suitable for use on an automated vehicle includes a camera, a radar-sensor and a controller. The controller is configured to assign a vision-identification to each vision-track associated with an instance of an object detected using the camera, and assign a radar-identification to each radar-glob associated with an instance of grouped-tracklets indicated detected using the radar-sensor. The controller is further configured to determine probabilities that a vision-track and a radar-glob indicate the same object. If the combination has a reasonable chance of matching it is includes in a further screening of the data to determine a combination of pairings of each vision-track to a radar-track that has the greatest probability of being the correct combination.

9 Claims, 4 Drawing Sheets

(56) References Cited

U.S. PATENT DOCUMENTS

2014/0333467 A1* 11/2014 Inomata ................ G01S 13/867
  342/27
2016/0291149 A1* 10/2016 Zeng ..................... G01S 13/931
2016/0320476 A1* 11/2016 Johnson ................... G06T 7/80

* cited by examiner

FEASIBILITY MATRIX

```
                RADAR GLOB ID
                1 2 3 4 5 6 7 8
                ─────────────────
V   1         │ 1 1 0 0 0 0 0 0
I   2         │ 1 1 1 0 0 0 0 0
S   3         │ 0 0 1 1 1 1 0 0
I   4         │ 0 0 0 1 1 1 1 0
O   5         │ 0 0 0 0 0 0 1 1
N
T R A C K  I D
```

"0" INDICATES NIT A FEASIBLE MATCH PAIR
"1" INDICATES A FEASIBLE MATCH PAIR

IN THIS EXAMPLE, VISION TRACK 1
IS A FEASIBLE MATCH TO RADAR
GLOBS 1 AND 2 ONLY

FIG. 3

LIST OF FEASIBLE MATCH PATTERNS

VISION TRACK ID ⟶  1 2 3 4 5

|   |   |   |   |   |   |
|---|---|---|---|---|---|
| 1 | 2 | 3 | 4 | 7 | ⟵ MATCH PATTERN 1 |
| 1 | 2 | 3 | 4 | 8 | ⟵ MATCH PATTERN 2 |
| 1 | 3 | 4 | 5 | 7 | ⟵ MATCH PATTERN 3 |
| 1 | 3 | 4 | 5 | 8 | • |
| 2 | 1 | 3 | 4 | 7 | • |
| 2 | 1 | 3 | 4 | 8 | • |

RADAR GLOB IDs ⟶

EACH MATCH PATTERN (ROW OF THE MATRIX) SHOWS WHICH
RADAR GLOB A PARTICULAR VISION TRACK IS MATCHED TO
UNDER THAT PATTERN. FOR EXAMPLE, IN MATCH PATTERN 3,
VISION TRACK 1 IS MATCHED TO RADAR GLOB 1, VISION TRACK
2 IS MATCHED TO RADAR GLOB 3, VISION TRACK 3 IS MATCHED
TO RADAR GLOB 4, ETC.

FIG. 4

ACCUMULATION OF MATCH PROBABILITIES

| VISION TRACK ID | | | | | NORMALIZED MATCH PATTERN QUALITY | CALCULATION OF INSTANTANEOUS RAW MATCH PROBABILITY FOR VISION TRACK 5 TO RADAR GLOB 7 |
|---|---|---|---|---|---|---|
| 1 | 2 | 3 | 4 | 5 | | |
| 1 | 2 | 3 | 4 | ⑦ | (0.113) | PROB{VIS 5 MATCHES RDR 7} = |
| 1 | 2 | 3 | 4 | 8 | 0.075 | 0.113 |
| 1 | 3 | 4 | 5 | ⑦ | (0.099) | + |
| 1 | 3 | 4 | 5 | 8 | 0.216 | 0.099 |
| 2 | 1 | 3 | 4 | ⑦ | (0.170) | + |
| 2 | 1 | 3 | 4 | 8 | 0.003 | 0.170 |
| • | • | • | • | • | • | + ... |

FEASIBLE MATCH PATTERNS →

FOR EACH VISION TRACK, CALCULATE RAW MATCH PROBABILITY TO EACH FEASIBLE RADAR GLOB BY USING THIS ACCUMULATION PROCESS OVER THE WHOLE TABLE OF FEASIBLE MATCH PATTERNS AND NORMALIZED MATCJH PATTERN QUALITY VALUES. THESE RAW MATCH PROBABILITY VALUES ARE THEN LOW-PASS FILTERED.

FIG. 5

OBJECT TRACKING SYSTEM WITH RADAR/VISION FUSION FOR AUTOMATED VEHICLES

TECHNICAL FIELD OF INVENTION

This disclosure generally relates to object tracking, and more particularly relates to a system that fuses information from a radar-sensor and a camera in order to determine relative motion of objects such as other-vehicles proximate to a host-vehicle.

BACKGROUND OF INVENTION

Image processing algorithms that identify or classify an object present in an image from an automated vehicle mounted camera based on the shape and apparent size of the object are known. However, it is difficult to measure distance to the object because of critical alignment necessary to make a distance measurement. Contrariwise, an automated vehicle radar-sensor can readily determine the distance to an object, but it is difficult to identify or classify an object based solely on an analysis of a reflected radar signal. It is known to 'fuse' or combine object detection data from different types of object detectors (e.g. camera, radar, lidar) to take advantage of the strengths of one type of sensor in order to compensate for the weaknesses of another type of sensor. However, the amount of data that the fusion process generates can undesirably increase the cost and complexity of the computing hardware that performs the fusion process.

SUMMARY OF THE INVENTION

Described herein is an object tracking system that includes or employs a fusion tracker used to combine information from host-vehicle sensors such as a speed-sensor and a yaw-rate-sensor, and object detection sensors such as a radar-sensor and a camera. The information is combined to estimate the number and identity of objects present in an area near the host-vehicle, and estimate, for example, position, velocity, trajectory, etc. of each object of interest. One of the difficult tasks in such a fusion tracker is deciding how the objects being tracked using the radar-sensor are related to the objects being tracked using the camera. In other words, the problem is how to match each vision-track to a radar-track (or to a cluster, or 'glob' of radar tracks). It has been observed that acceptable performance is achieved if it is assumed here that the vision side of the system produces at most one vision track on each object of interest, but the radar-sensor is allowed to produce several radar tracks on each object (or as many as 40 or 50 in the case of a large truck). The system described herein includes a radar/vision matching algorithm especially suited to detect other-vehicles proximate to the host-vehicle vehicular objects.

In accordance with one embodiment, an object tracking system suitable for use on an automated vehicle is provided. The system includes a camera, a radar-sensor and a controller. The camera is used to capture an image of a vision-field-of-view (VFOV) of the camera. The radar-sensor is used to detect a radar-signal reflected from a radar-field-of-view (RFOV) that overlaps the VFOV. The controller is in communication with the camera and the radar-sensor. The controller is configured to assign a vision-identification to each vision-track associated with an instance of an object detected in the image by the controller. The controller is further configured to assign a radar-identification to each radar-glob associated with an instance of grouped-tracklets indicated by the radar-signal. The controller is further configured to determine a match-feasibility for each combination of vision-track and radar-glob, wherein each match-feasibility is a binary-value set equal to one (1) when at least one of a) an azimuth-difference between a vision-angle of the vision-track and a radar-angle of a radar-glob is less than an azimuth-threshold, b) a distance-difference between a vision-distance of the vision-track and a radar-distance of a radar-glob is less than a distance-threshold, and c) a speed-difference between a vision-speed of the vision-track and a radar-speed of a radar-glob is less than a speed-threshold. The controller is further configured to select from all possible vision-track and radar-glob pairing-combinations a list of feasible-match-patterns, where a pairing-combination is a feasible-match-pattern when the match-feasibility of each combination of vision-track and radar-glob in the pairing-combination is equal to one. The controller is further configured to determine a quality-value of each instance of the feasible-match-pattern. The quality-value based on a reciprocal of a weighted-combination of instances of the azimuth-difference, the distance-difference, and the speed-difference used to determine the match-feasibility. The controller is further configured to determine a normalized-value for each quality-value by scaling the quality-values with a scaling-factor selected so a sum of the normalized-values is equal to one (1). The controller is further configured to calculate a raw-probability for each combination of vision-track and radar-glob by summing the normalized-values of the feasible-match-patterns that indicate a match for that combination of vision-track and radar-glob.

In another embodiment, the controller is further configured to determine a match-probability for each combination of vision-track and radar-glob by low-pass filtering of the raw-probability obtained for that combination, determine a need for re-organize test of the existing associations between vision-tracks and radar-globs by comparing the match-probabilities for combinations of vision-track and radar-glob to an upper-threshold and a lower-threshold, and implement a re-organize test of associations between vision-tracks and radar-globs when one of the match-probabilities transitions from less than to greater than the upper-threshold or from greater than to less than the lower-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 3 is a feasibility matrix determined by the system of FIG. 1 in accordance with one embodiment;

FIG. 4 is a list of feasible match patterns determined by the system of FIG. 1 in accordance with one embodiment; and FIG. 5 is an accumulation of match probabilities determined by the system of FIG. 1 in accordance with one embodiment.

DETAILED DESCRIPTION

Figure 1:
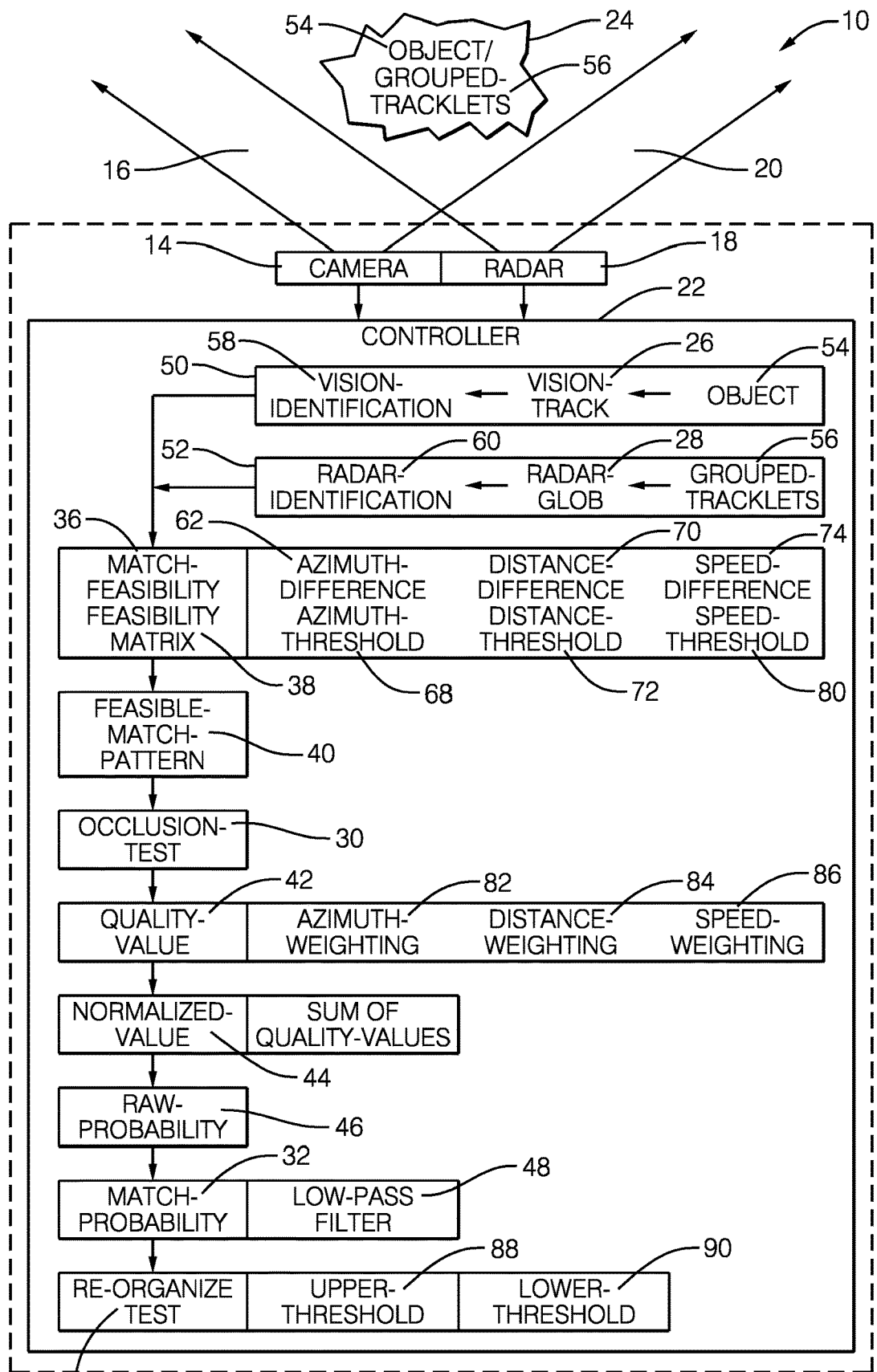
FIG. 1 is a diagram of an object tracking system in accordance with one embodiment.

FIG. 1 illustrates a non-limiting example of an object tracking system 10, hereafter the system 10, which is generally suitable for use on an automated vehicle, hereafter the host-vehicle 12. The system 10 includes a camera 14 used to capture an image of a vision-field-of-view 16, hereafter the VFOV 16 of the camera 14, and a radar-sensor 18 used to detect a radar-signal reflected from a radar-field-of-view 20, hereafter the RFOV 20. In general the VFOV 16 and the RFOV 20 overlap such that a majority fraction of each covers the same area, so that an instance of an object detected in the peripheral sensing area one device (the camera 14 or the radar-sensor 18) is not missed by the other device. While FIG. 1 may suggest that the camera 14 and the radar-sensor 18 are arranged side-by-side, this is only to simplify the illustration. It is recognized that aligning the camera 14 and the radar-sensor 18 with each other is simplified if the two devices are located close together, but this is not are requirement of the system 10. It is believed that the construction and operation of the system 10 would be generally optimized if the VFOV 16 and the RFOV 20 were the essentially the same areas as suggested in FIG. 2.

Figure 2:
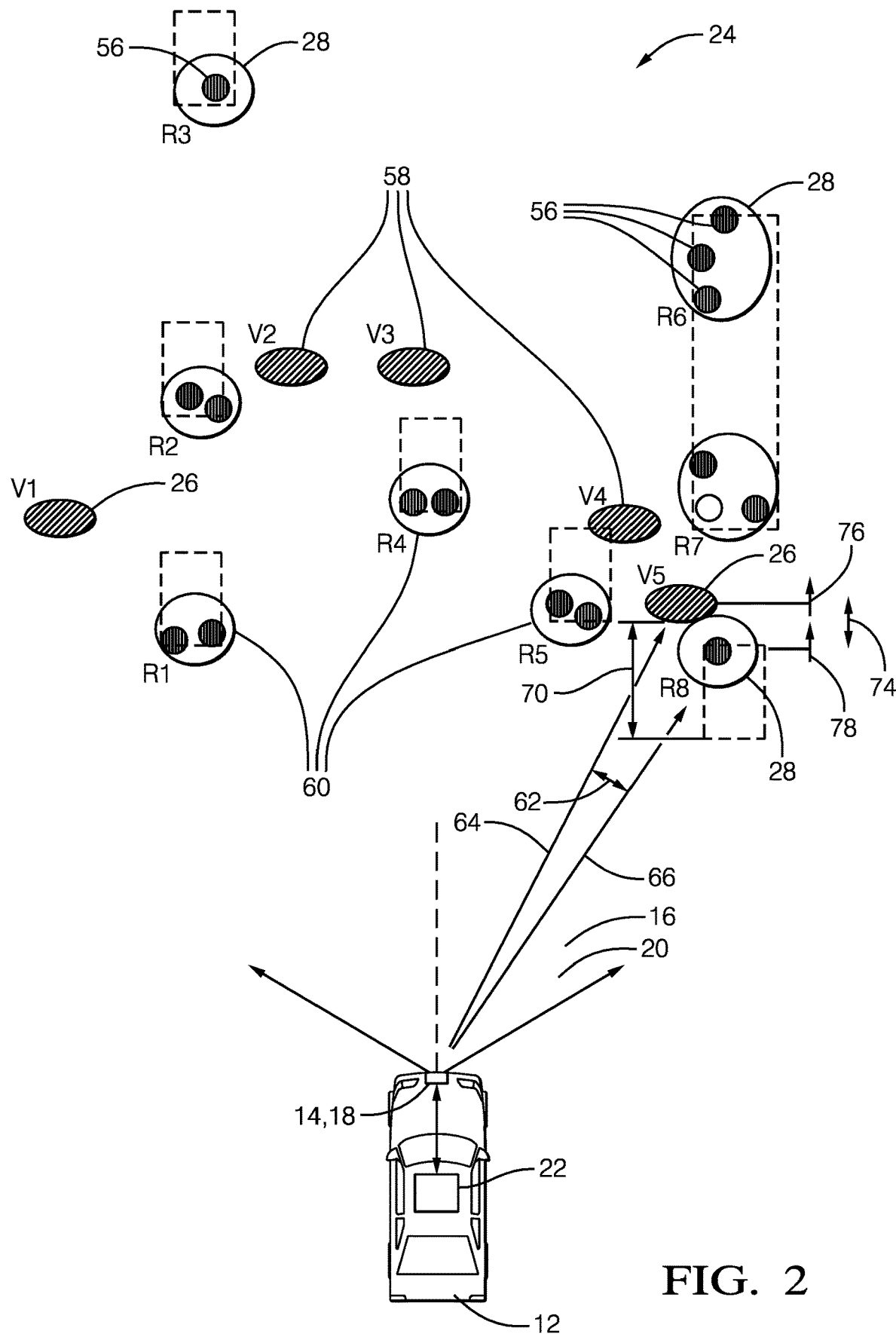
FIG. 2 is a traffic scenario experienced by the system of FIG. 1 in accordance with one embodiment.

The system 10 also includes a controller 22 in communication with the camera 14 and the radar-sensor 18. The controller 22 may include a processor (not specifically shown) such as a microprocessor or other control circuitry such as analog and/or digital control circuitry including an application specific integrated circuit (ASIC) for processing data as should be evident to those in the art. The controller 2 may include memory (not specifically shown), including non-volatile memory, such as electrically erasable programmable read-only memory (EEPROM) for storing one or more routines, thresholds, and captured data. The one or more routines may be executed by the processor to perform steps for determining, for example, the identity, location, speed, and direction of travel of one or more instance of actual-objects 24 based on signals received by the controller 22 from the camera 14 and the radar-sensor 18 and processed as described in more detail below. The actual-objects 24 in FIG. 2 are indicated by the dashed rectangles, where the relative sizes of the rectangles indicate a relative size of the actual-objects 24 with respect to each other.

In general, the system 10 described herein, in which data from radar-sensor 18 and the camera 14 is fused, is implemented on the host-vehicle 12; however this is not a requirement. The actual-objects 24 in the scene, i.e. the other-vehicles, can be moving in any direction, but for simplicity of explanation here, it is assumed that all objects are moving in roughly the same direction as the host-vehicle 12. A vision-portion 50 of the system 10 onboard the host-vehicle 12 is assumed to work independently of a radar-portion 52 of the system 10. It provides a list of objects being tracked, along with estimates for each object of its position, velocity, object class, and azimuth angle to a 'centroid' reference point on the object (e.g., the center of the rear face of a preceding vehicle) and (part of the time) the 'extent angles' to the near corners of the vehicular object. FIG. 2 shows a plan-view ("bird's eye" view) of this.

The radar-portion 52 of the system 10 onboard the host-vehicle 12 reports at each time instant a list of 'detections'. Each detection instance typically consists of a range value, a range-rate value, and an azimuth angle value. The radar tracker observes these detection lists over time, and creates a list of 'tracklets' (i.e., radar tracks on scattering centers, which are radar 'bright spots' on the target vehicle). Each tracklet contains information gleaned over time, such as position, velocity, acceleration and status information indicating how recently a detection instance was used to update this tracklet.

So, similar to the vision-portion 50, the radar-portion 52 provides a list of radar tracks, which are assumed to mostly be tracking scattering centers on the vehicles it detects. There are generally more than one such tracklet on a given vehicle which is unobstructed and at reasonably close range. Functionality in the fusion tracker referred to as "Grouping", is assumed to have already grouped these tracklets into "radar globs". This task isn't very difficult in an ordinary highway scene with moderate spacing between vehicles. Thus, each radar glob is effectively a grouped radar track on a vehicular object. The specific way in which this grouped radar track is formed (e.g., by grouping tracklets) is not important to the matching algorithm. For example, a different but perfectly allowable scheme would be one in which the grouped radar track is formed by directly tracking the sequence of sets of multiple detections on the object (i.e., "tracking groups", rather than "grouping tracks").

The matching or fusion algorithm described herein is generally directed to detecting vehicular objects, i.e. other vehicles. This makes some of the matching easier. For example, it would appear to be a reasonable assumption that the radar-sensor can detect any vehicle which the camera can detect. This restriction to a subset of the possible objects in the scene reduces the combinatorial complexity of the matching making the calculations feasible in real-time on an automotive-grade processor. Ideally, when considering how to match radar and vision tracks, one would have estimates of the sensor systems' uncertainties in the estimates they are providing (in addition to the estimates themselves). Since these estimates are unavailable for the sensor systems used in some embodiments of the system 10, information borrowed from 'expert knowledge' of these systems is utilized.

As noted before, the vision-portion 50 of the system 10 is relatively good at estimating the centroid azimuth angle, and is also good at classifying the type of object (e.g., Car, Motorcycle, Truck, etc.). The vision-portion 50 is, relatively speaking, not especially good at estimating position or velocity of an object. These estimates are utilized by the matching algorithm, but only with a healthy disrespect for their accuracy. For example, a 100% error in the estimated longitudinal position of an object is not uncommon for the vision system, meaning an object determined to be at 100 m downrange might actually be at 200 m. In contrast, the radar-portion 52 is relatively good at measuring range and range-rate, but not so good at measuring the azimuth angle. The complementarity of these strengths/weaknesses in the radar-portion 52 and vision-portion 50 of the system 10 is what makes the fusion of their estimates so desirable, but also makes the matching difficult.

In the following, the term 'match pattern' refers to a specific way of assigning N (out of M>=N) different radar-globs (R1, R2 . . . R8 in FIG. 2) to the N vision-tracks (V1, V2 . . . V5 in FIG. 2) under consideration. The term 'feasible match pair' refers to a particular vision-track 26 (FIG. 1) and radar-glob 28 pair which are deemed by the matching algorithm to be a legitimate candidate pair for matching, based on consideration of the possible errors in their estimates. A 'feasible match pattern' is a match pattern consisting of N feasible match pairs. A feasible match pattern may later be deemed 'infeasible' by an occlusion-test 30 due to an apparent occlusion of one of the proposed matches by a closer object which apparently should be blocking the camera's view of the more distant object (making that proposed match of the vision track to that more distant radar glob appear to be impossible). Any single problem with a match pattern causes the whole pattern to be infeasible. It is expected that some of the available radar globs may not be matched to vision tracks because they correspond to objects which are detected by the radar but not by vision.

The matching algorithm described herein effectively calculates for each instance of the vision-track 26 (e.g. V1, V2 . . . V5), the probability that a particular instance of the vision-track 26 should be matched to each of a (limited) number of instances of the radar-glob 28 (e.g. R1, R2 . . . R8). By way of example and not limitation, an outcome of the algorithm, the details of which will be described later, is a match-probability 32 that a particular instance of the vision-track 26, e.g. V3, is matched to a particular instance of the radar-glob 28 (e.g. R3, R4, R1). For the scenario shown in FIG. 2, the match-probability 32 for some combinations are V3:R3=0.77, V3:R4=0.15, and V3:R1=0.08. The match-probability 32 for other combinations of a particular instance of the vision-track 26 to a particular instance of the radar-glob 28 are set to zero by the occlusion-test 30 or other tests that will be described in more detail later, and/or because the probability is too low, e.g. below some threshold. That is, for each instance of the vision-track 26 there are several candidates of the radar-glob 28 considered suitable for matching. It is also contemplated that the match-probability 32 may be determined based on present information from the camera 14 and the radar-sensor 18, and on historical information as will be described in more detail below.

In the figure above, if vision ID 3 is not already matched to radar glob 3 (which has match probability 0.77), then if that match probability exceeds a threshold (e.g., 0.60) a rearrangement of the existing radar/vision matches will be made in order to enable this radar/vision pair to be matched. Note that it should not be possible for two different vision tracks to both have match probabilities to radar glob 3 which exceed a sufficiently high threshold.

How historical information may influence the pairing of instances of the vision-track 26 and the radar-glob 28 will now be considered. If V3 were matched to R1 prior to the present instant (which has match probability 0.08), and a predetermined minimum threshold of 0.10 had been established, then that radar/vision match would be split apart. In general, all of the required new-match and break-up-match actions are considered simultaneously in a re-organize test 34. This allows a minimum of undesirable fused track ID switching to result from the re-organize test 34.

An outline of the steps in this matching algorithm is now presented. The term 'motion status' refers to a determination of overall over-the-ground motion, i.e., oncoming, stationary, receding.

Create a list of radar-globs to be considered.
   Calculate pertinent features of these radar-globs, e.g., motion status, position, velocity.
Create a list of vision-tracks.
   Calculate pertinent features, e.g., motion status.
Feasibility Testing of candidate match pairs to create a Feasibility-Matrix.
Remove from consideration any totally infeasible radar globs or vision tracks.
LOOP over feasible-match-patterns (match patterns created by inspection of Feasibility Matrix).
   Occlusion test.
   IF pattern okay,
     Add to list of match patterns,
     Calculate quality-value of match pattern.
   END
END LOOP -continued Normalize match pattern quality-values (e.g., so sum equals 1.0).
Clean up radar/vision match probabilities by removing any New/Dead radar-globs from probability lists.
Special handling of case of zero feasible patterns.
Reduce all match-probabilities (first step of low-pass filtering of match probabilities).
Accumulate match info from feasible-match-patterns to get instantaneous raw-probabilities.
Update match-probabilities using raw-probability values (second step of low-pass filtering).
Plan re-organize test (based on match probabilities).
Re-organize radar/vision matches.

Elaboration on some of the steps listed above follows.

Feasibility Testing of Candidate Match Pairs to Create a Feasibility-Matrix.

FIG. 3 illustrates a non-limiting example of a feasibility-matrix 38. By comparing the state estimates of various instances of the vision-tracks 26 and radar-globs 28 the match-feasibility 36 is determined for each possible pairing. The results are stored in the feasibility-matrix 38. This 'pre-gating' of potential radar/vision match-ups is done to reduce combinatorial complexity and is based on similarities between radar and vision tracks in the areas of motion status, azimuth angle, longitudinal position and longitudinal velocity.

It is contemplated that the gates for this pre-gating may be varied, for example may be widened when a particular radar/vision pair has been matched for a long time and is believed to be a correct match-up. The widened gate can be of use in maintaining this correct match even if there are brief errors in the vision or radar tracks which are sufficiently large to otherwise cause a match break-up. By examining the entries which are equal to one, a sequence of all possible feasible match patterns is then generated. Some of these feasible match patterns may be rejected later by the occlusion-test 30.

The purpose of this 'pre-gating' using the feasible match pair determination and the resulting instance of the feasibility-matrix 38 is to significantly reduce the number of match patterns that need to be examined. For the non-limiting example in the figures with five instances of the vision-tracks 26 and eight instances of the radar-globs 28, there are 6720 match patterns which would need to be considered without the pre-gating. With the pre-gating, there are less than 192 patterns (192=product of the number of 1's in each row, i.e., 2*3*4*4*2, but this is an overestimate because it doesn't account for multiple rows having 1's in the same column).

LOOP Over Feasible Match Patterns (Match Patterns Created by Inspection of Feasibility Matrix).

FIG. 4 illustrates a non limiting example of a list of feasible-match-patterns 40 from FIG. 3 that are looped over with the intent of creating a final list of patterns which also passed the occlusion-test 30. A quality-value 42 is also measured for each of instance of the feasible-match-patterns 40.

Occlusion Test.

The purpose of the occlusion-test 30 is to rule out unlikely matches. For example, say there are two cars in front of the host-vehicle 12, all in the same lane, and there is a distinct instance of the radar-glob 28 for each of the two preceding vehicles. There is also an instance of the vision-track 26 characterized by an azimuth angle that is a good match to either of the radar globs 28. The occlusion-test determines that it is unlikely that the vision-portion 50 is seeing the second (more distant) car, because the first (closest) car would be blocking the view of or line of sight to the second car. Because of this, a match between the vision-track 26 and the first car would be approved by the occlusion-test 30. If the current match pattern is suggesting that the vision-track 26 should be matched to the second car, then the occlusion-test 30 would invalidate that match pattern, and processing would continue on to the next match-pattern on the list. That is, given that a match-pattern under consideration may try to match the further instance of the radar-glob 28 to the instance of the vision-track 26 under consideration, and the nearer instance of the radar-glob 28 is also a legitimate match to the instance of the vision-track 26 under consideration (e.g. both are known to be vehicles and have the same motion-status, etc.), then the occlusion-test 30 will mark the match-pattern that pairs the vision-track 26 to the further (occluded) instance of the radar-glob 28 as 'infeasible' because of visual occlusion by the nearer radar-glob.

An exception to this is if the current match pattern under consideration also commands that the closer radar glob be matched to a different vision track. In that case, the more distant match will be allowed. An example of this can happen when one vehicle is passing another vehicle and then changes lanes to be in front of that other vehicle. The vision system can hold on to the vision track on the more distant vehicle for an interval of time, even though that distant vehicle is largely occluded by the closer vehicle.

Calculate Quality of Match Pattern.

Each feasible match pattern has a quality-value 42 determined. The quality-value 42 is intended to represent a Bayesian-style likelihood under presumed error models. The quality-value 42 may be calculated as a reciprocal of a sum over the indicated match pairs of the weighted squared differences in azimuth angle, longitudinal position, and longitudinal velocity in each radar-glob/vision-track pair. The quality-value 42 is decreased if any of the indicated matches involve a 'suspicious' radar-glob (i.e., the fusion tracker has low confidence in the validity or accuracy of one or more of the tracklets in that radar-glob). A matched radar/vision pair will have an increased value of the quality-value 42 if the radar-glob 28 and vision-track 26 estimates agree well in those three categories. The more they disagree with each other, the less the quality-value 42, hence, the less the likelihood or probability that they actually match.

The quality-value 42 for each of the final feasible match patterns are normalized to provide a normalized-value 44 scaled so the sum of the normalized-values is equal to 1.0. In the 'Accumulate match info' step (described next), these normalized-values are interpreted as probabilities of match patterns being correct.

Accumulate Match Info from Feasible Match Patterns to Get Instantaneous Raw-Probabilities.

FIG. 5 illustrates a non-limiting example of a key step in calculating the raw-probability 46 for each vision/radar pair, e.g. for vision-track Vi and radar-glob Rj. The way this matching algorithm works is to identify a list of acceptable potential match patterns, give each of them a normalized-value 44, then add up all of the normalized-values 44 for match patterns which match up vision-track Vi and radar-glob Rj.

As an example, let vision ID 1 (V1) is matched to radar-glob ID 2 (R2) in every single match pattern on the list. In the accumulation process just described, the raw-probability 46 for this pair will sum to 1.0. This probability value matches one's intuition based on the observation that this pair was matched in every feasible pattern. In cases where this pair is matched in only a fraction of the patterns, the raw-probability 46 will be between 0.0 and 1.0, depending on the quality/probability of the patterns in which that match appeared. If the pair is matched in none of the patterns, the raw-probability 46 will be 0.0.

Reduce all Match Probabilities (First Step of Low-Pass Filtering of Match Probabilities) and Update Match Probabilities Using Raw-Probability Values (Second Step of Low-Pass Filtering).

These two steps represent applying a low-pass filter 48 to of the raw-probability 46 to obtain the match probability for selected radar/vision pairs of sufficiently high probability. A first-order low-pass filter operation in discrete-time can be represented by an equation like $x_k = \alpha x_{k-1} + (1-\alpha)u_k$, where $x_k$ is the filtered output value at time k, $u_k$ is the raw input value at time k, and $\alpha$ is the filter gain coefficient (a value between 0.0 and 1.0).

The term $\alpha x_{k-1}$ represents the reduction in match probabilities, and the term $(1-\alpha)u_k$ represents the match probability update using the raw value. In cases where zero feasible match patterns are found, the $u_k$ term is effectively equal to zero, and only the probability reduction step takes place.

A possible value for a is 0.8. As an example, assume a particular radar/vision match pair has a match probability of 0.0 when suddenly that pair looks like a great match, and a raw-probability value of 1.0 is computed. If this raw-probability is maintained for several steps, the (filtered) match probability will take the values 0.0, 0.2, 0.36, 0.49, 0.59, 0.67, . . . At some point, this value will exceed a threshold (e.g., 0.6) and the radar/vision matches will be re-organized to execute that match-up. So for this threshold, it takes (at least) 5 steps for the match to be made.

In the matching algorithm described herein, an exception may be allowed under some conditions. If the vision track is currently unmatched and then has a sufficiently high value of the raw-probability 46 to a particular radar glob, then the filtered match probability is allowed to jump to 1.0. This allows for an immediate match to be available for fusion in these unambiguous match cases. If the match is ambiguous for that vision track, then the probabilities must be allowed to drift up or down in accordance with the scheme described above.

Plan Re-Organize Test (Based on Match Probabilities).

In the re-organize test 34, the match probabilities are inspected for each vision track. There may be vision tracks which have a match probability above the threshold for matching to a radar glob to which they are not currently matched. Or maybe the match probability for an existing matched radar/vision pair has dropped below a threshold and these two need to be broken apart. In the former case, it may be that the radar glob which this vision track wants is already matched to a different vision track, so that other fused track will need to be split apart before any new matching can take place. Or in that same case, the vision track under consideration may already be matched to a radar glob, so that fused track will need to be split apart.

The re-organize test 34 is conceptually straightforward. It first breaks apart all of the fused tracks which contain radar or vision pieces needed in the re-organize test, and then re-assembles the pieces as indicated by the match probabilities.

There is also a need for minimizing the switching of fused track IDs and for maintaining the ID on the correct piece in a way that is most satisfying to the warning/convenience features which are using the fusion tracker output.

Re-Organize Radar/Vision Matches

This step is a conceptually simple implementation of the planned re-organize test of the radar and vision pieces of fused tracks. The planning step has already mapped out which radar/vision fused tracks will need to be broken apart, and which of the pieces will need to be put together. The fused track IDs of all of the fused tracks involved in the re-organize test has been predetermined in the planning in a way which minimizes unnecessary ID switching. The fused track states of the re-organized fused tracks are adjusted to account for the state values of the new radar and vision pieces.

It is noted that the algorithm described herein may also include tests to identify suspiciousness of radar globs, vision/radar pairs with long histories of good matching, suspected disappearing radar tracklets, etc. Match probabilities are maintained for each vision track to a small set of potential radar-globs which are feasible matches to that vision-track. These match probabilities are obtained by low-pass filtering the values of the raw-probability 46 for each potential vision/radar match-up. The raw-probability 46 for a particular vision/radar pair is obtained by summing the normalized-values 44 of the feasible match patterns which indicate that match-up. The list of feasible match patterns is obtained efficiently by pre-gating recorded by a feasibility matrix which indicates which individual vision/radar pairs are sufficiently similar that their match-up could be part of a feasible match pattern. Each resulting feasible match pattern is additionally scrutinized by the Occlusion function for sensibility, and the match pattern's quality is measured as a function of the discrepancies between radar and vision track state information in each of the indicated radar/vision matches in the pattern. Finally, vision/radar match probabilities are compared to thresholds and, if needed, re-organization of some of the existing fused tracks is planned and implemented in order to come into compliance with the dictates of the match probabilities.

Referring again to FIG. 1, the object tracking system 10, which is generally suitable for use on an automated vehicle (e.g. the host-vehicle 12), includes a camera 14 used to capture an image of the VFOV 16 of the camera 14, and a radar-sensor 18 used to detect a radar-signal reflected from the RFOV 20 of the radar-sensor 18 which overlaps the VFOV 16. Preferably the overlap is such that the VFOV 16 and the RFOV 20 are the same areas or essentially (e.g. >90%) the same areas, but this is not a requirement.

The system 10 includes a controller 22 in communication with the camera 14 and the radar-sensor 18 so that the controller 22 receives data or information from the camera 14 and the radar-sensor 18 for detecting the presence of actual-objects 24 in the respective fields-of-view. The controller 22 is configured or programmed to perform a number of steps to match instances of an object 54 detected by the camera 14 with instances of grouped-tracklets 56 detected by the radar-sensor 18. While the steps below are characterized in terms of first, second, third, etc., steps, this does not suggest that the steps must be performed in the exact order presented, or that other intervening steps are excluded, or that all of the steps described are absolutely required.

A first step may be to assign a vision-identification 58 to each instance of a vision-track 26 associated with an instance of an object 54 detected by the controller in the image (i.e. information or signal) from the camera 14. FIG. 2 illustrates a non-limiting example of a traffic scenario that the system 10 may encounter where the vision-identification 58 is assigned based on the detection of the actual-objects 24 and are indicated as V1, V2, V3, V4, and V5.

A second step may be to assign a radar-identification 60 to each instance of a radar-glob 28 associated with an instance of grouped-tracklets 56 indicated by the radar-signal detected by the radar-sensor 18. FIG. 2 illustrates a non-limiting example where the radar-identification 60 is assigned based on the detection of the actual-objects 24 and are indicated as R1, R2, R3, R4, R5, R6, R7, and R8.

A third step may be to determine a match-feasibility 36 for each combination of vision-track 26 and radar-glob 28. Each match-feasibility 36 is a binary-value set equal to zero (0) or one (1) depending on the outcome of a comparison or test of how closely related an instance of a vision-track 26 and a radar-glob 28 are to each other. By way of example and not limitation, the match-feasibility 36 of a particular combination of vision-track 26 and radar-glob 28 is set to one (1) when at least one of a) an azimuth-difference 62 between a vision-angle 64 (FIG. 2) of the vision-track 26 and a radar-angle 66 of a radar-glob 28 is less than an azimuth-threshold 68, e.g. five degrees of angle)(5°); b) a distance-difference 70 between a vision-distance of the vision-track 26 and a radar-distance of a radar-glob 28 is less than a distance-threshold 72, e.g. five meters (5 m) or twenty percent (20%) whichever is greater; and c) a speed-difference 74 between a vision-speed 76 of the vision-track 26 and a radar-speed 78 of a radar-glob 28 is less than a speed-threshold 80, e.g. five kilometers-per-hour (5 kph). The differences may be calculated as absolute values, e.g. azimuth-difference=|vision-angle−radar-angle|, distance-difference=|vision-distance−radar-distance|, and speed-difference=|vision-speed−radar-speed|.

By way of example and not limitation, in one embodiment, the vision-speed 76 and the radar-speed 78 may be indicative of a longitudinal-velocity of the vision-track 26 and the radar-glob 28, respectively. That is, only the portion of the vision-speed 76 and the radar-speed 78 that is parallel to the present travel-direction of the host-vehicle 12 may be considered, and any relative lateral movement may be ignored. In another embodiment, the vision-distance (not shown) and the radar-distance (not shown) may be indicative of a longitudinal-position of the vision-track and the radar-glob, respectively. That is, only the distance parallel to the present travel-direction of the host-vehicle 12 may be considered, and any lateral offset may be ignored.

Various alternative rules may be used to determine the match-feasibility 36. For example, the match-feasibility 36 for a particular combination of vision-track 26 and radar-glob 28 may be set equal to zero (0) when the azimuth-difference 62 is not less than the azimuth-threshold 68 regardless of the values of the distance-difference 70 and the speed-difference 74. Alternatively, each match-feasibility is set equal to one (1) only when all of the tests are passed, e.g. a) the azimuth-difference 62 is less than the azimuth-threshold 68, b) the distance-difference 70 is less than the distance-threshold 72, and c) the speed-difference 74 between is less than the speed-threshold 80. Alternatively, each match-feasibility is set equal to one (1) when at least one of a) the azimuth-difference is less than the azimuth-threshold, b) the distance-difference is less than the distance-threshold, c) the speed-difference between is less than the speed-threshold, and d) a vision-motion-status (not shown) of the vision-track 26 matches a radar-motion-status (not shown) of the radar glob 28, where the vision-motion-status and the radar-motion-status are each characterized by one of oncoming, stationary, and receding which indicate the direction of over-the-ground motion relative to the host-vehicle 12. In determining motion status, over-the-ground motion, not motion relative to the host-vehicle's motion, is key. For example, assume there is another car in front of the host-vehicle 12 which is moving in the same direction but at a reduced speed. The relative motion of that other vehicle is towards the host-vehicle, but it is not characterized as oncoming. Since its over-the-ground motion is in the same direction as the host-vehicle is moving, it is characterized as receding.

A fourth step may be to select from all possible vision-track and radar-glob pairing-combinations a list of feasible-match-patterns 40. A pairing-combination is characterized as a feasible-match-pattern when the match-feasibility 36 of each combination of vision-track 26 and radar-glob 28 in the pairing-combination is equal to one (1). By way of example, all of the match-feasibilities 36 of a pairing-combination may be multiplied together. If the result is one, then each instance of the match-feasibility is one. However, if the result is zero, then at least one instance of the match-feasibility is zero.

A fifth step may be to determine a quality-value 42 of each instance of the feasible-match-patterns 40. The quality-value 42 may be based on a reciprocal of a weighted-combination of instances of the azimuth-difference 62, the distance-difference 70, and the speed-difference 74 used to determine the match-feasibility 36. The weighting of each of the differences may be predetermined values, e.g. an azimuth-weighting 82, a distance-weighting 84, and a speed-weighting 86, which may be predetermined values determined by empirical testing.

A sixth step may be to determine a normalized-value 44 for each quality-value 42 by scaling the quality-values 42 with a scaling-factor selected so a sum of the normalized-values is equal to one (1), i.e. normalized-value(i)=quality-value(i)/sum[all quality-values].

A seventh step may be to calculate a raw-probability 46 for each combination of vision-track 26 and radar-glob 28 by summing the normalized-values 44 of the feasible-match-patterns 40 that indicate a match for that combination of vision-track 26 and radar-glob 28.

An eighth step may be to determine a match-probability 32 for each combination of vision-track 26 and radar-glob 28 by low-pass filtering 48 of the raw-probability 46 obtained for that combination.

A ninth step may be to determine a need for re-organize test 34 of the existing associations between vision-tracks 26 and radar-globs 28 by comparing the match-probabilities 32 for combinations of vision-track 26 and radar-glob 28 to an upper-threshold 88 and a lower-threshold 90, and implement a re-organize test 34 of associations between vision-tracks 26 and radar-globs 28 when one of the match-probabilities 32 transitions from less than to greater than the upper-threshold 88 or from greater than to less than the lower-threshold 90.

An additional step between the fourth step and the fifth step may be to perform an occlusion-test 30 on radar-globs characterized by substantially equal values of azimuth-angle to null the match-probability for any combination of vision-track 26 and radar-glob 28 that the occlusion-test 30 indicates is not possible because the line of site to one is occluded by the other.

Accordingly, an object tracking system (the system 10), a controller 22 for the system 10 and a method described in terms of steps is provided. In particular, an improved way to match the vision-tracks 26 detected by the camera 14 to radar-globs 28 detected by the radar-sensor 18 is provided. Advantageously, the amount of data processing has been reduced by excluding some of the possible combinations via a gating process that determine the match-feasibility 36 of each possible combination.

While this invention has been described in terms of the preferred embodiments thereof, it is not intended to be so limited, but rather only to the extent set forth in the claims that follow.

I claim:

1. An object tracking system suitable for use on an automated vehicle, said system comprising:
   a camera used to capture an image of a vision-field-of-view (VFOV) of the camera;
   a radar-sensor used to detect a radar-signal reflected from a radar-field-of-view (RFOV) that overlaps the VFOV; and
   a controller in communication with the camera and the radar-sensor, said controller configured to assign a vision-identification to each vision-track that indicates a vision-motion-status associated with an instance of an object detected in the image by the controller,
   assign a radar-identification to each radar-glob that indicates a radar-motion-status associated with an instance of grouped-tracklets indicated by the radar-signal,
   determine a match-feasibility for each combination of vision-track and radar-glob, wherein each match-feasibility is a binary-value set equal to one (1) when at least one of
   a) an azimuth-difference between a vision-angle of the vision-track and a radar-angle of a radar-glob is less than an azimuth-threshold,
   b) a distance-difference between a vision-distance of the vision-track and a radar-distance of a radar-glob is less than a distance-threshold, and
   c) a speed-difference between a vision-speed of the vision-track and a radar-speed of a radar-glob is less than a speed-threshold,
   select from all possible vision-track and radar-glob pairing-combinations a list of feasible-match-patterns and determine a fused track based on the vision-motion-status and the radar-motion-status, wherein a pairing-combination is a feasible-match-pattern when the match-feasibility of each combination of vision-track and radar-glob in the pairing-combination is equal to one,
   determine a normalized-value for each instance of the feasible-match-pattern, and
   calculate a raw-probability for each combination of vision-track and radar-glob by summing the normalized-values of the feasible-match-patterns that indicate a match for that combination of vision-track and radar-glob.

2. The system in accordance with claim 1, wherein the controller is configured to
   determine a match-probability for each combination of vision-track and radar-glob by low-pass filtering of the raw-probability obtained for that combination,
   determine a need for a re-organize test of the existing associations between vision-tracks and radar-globs by comparing the match-probabilities for combinations of vision-track and radar-glob to a threshold, and
   implement a re-organize test of associations between vision-tracks and radar-globs when one of the match-probabilities transitions the threshold.

3. The system in accordance with claim 1, wherein the match-feasibility for a combination of vision-track and radar-glob is set equal to zero (0) when the azimuth-difference is greater than the azimuth-threshold.

4. The system in accordance with claim 1, wherein each match-feasibility is set equal to one (1) only when
   a) the azimuth-difference is less than the azimuth-threshold,
   b) the distance-difference is less than the distance-threshold, and
   c) the speed-difference between is less than the speed-threshold.

5. The system in accordance with claim 1, wherein each match-feasibility is set equal to one (1) when at least one of
   a) the azimuth-difference is less than the azimuth-threshold,
   b) the distance-difference is less than the distance-threshold,
   c) the speed-difference between is less than the speed-threshold, and
   d) a vision-motion-status of the vision-track matches a radar-motion-status of the radar glob, wherein the vision-motion-status and the radar-motion-status are each characterized by one of oncoming, stationary, and receding.

6. The system in accordance with claim 1, wherein the vision-speed and the radar-speed are indicative of a longitudinal-velocity of the vision-track and the radar-glob, respectively.

7. The system in accordance with claim 1, wherein the vision-distance and the radar-distance are indicative of a longitudinal-position of the vision-track and the radar-glob, respectively.

8. The system in accordance with claim 1, wherein the quality-value is based on a reciprocal of a square-root of a weighted-summation of squares of the azimuth-difference, the distance-difference, and the speed-difference.

9. The system in accordance with claim 1, wherein the controller is configured to perform an occlusion-test on radar-globs characterized by substantially equal values of azimuth-angle to null the match-probability for any combination of vision-track and radar-glob that the occlusion-test indicates is not possible.

* * * * *